US006680438B1

(12) United States Patent
Campbell et al.

(10) Patent No.: US 6,680,438 B1
(45) Date of Patent: Jan. 20, 2004

(54) DECORATIVE ELECTRICAL OUTLET AND SWITCH PLATE COVER

(76) Inventors: Robert W. Campbell, 124 Clara, Schriever, LA (US) 70395; Kipeland J. Campbell, 179 St. Bridget Dr., Schriever, LA (US) 70395

( * ) Notice: Subject to any disclaimer, the term of this patent is extended or adjusted under 35 U.S.C. 154(b) by 0 days.

(21) Appl. No.: 10/345,777

(22) Filed: Jan. 16, 2003

(51) Int. Cl.[7] ................................. H01H 3/02
(52) U.S. Cl. ..................... 174/66; 174/67; 220/241; 220/242; 439/148
(58) Field of Search ............... 174/66, 67; D8/353; 220/241, 242, 375; 439/148, 142; D13/177

(56) References Cited

U.S. PATENT DOCUMENTS

| 2,984,725 | A | | 5/1961 | Hubbell et al. | |
|---|---|---|---|---|---|
| 3,028,467 | A | | 4/1962 | Hubbell | |
| 3,892,935 | A | | 7/1975 | Patterson | |
| 4,234,774 | A | | 11/1980 | Paparella | |
| 4,250,349 | A | * | 2/1981 | Bennett | 174/67 |
| 4,731,511 | A | | 3/1988 | Steinhilber et al. | |
| 4,774,384 | A | * | 9/1988 | Gregory | 174/67 |
| 4,801,271 | A | * | 1/1989 | Piper | 439/148 |
| 4,972,045 | A | | 11/1990 | Primeau | |
| 5,212,347 | A | | 5/1993 | Powers et al. | |
| 5,240,426 | A | | 8/1993 | Baris | |
| 5,675,125 | A | | 10/1997 | Hollinger | |
| 5,675,126 | A | | 10/1997 | Halvorsen | |
| 5,900,584 | A | * | 5/1999 | Cady et al. | 174/66 |
| 6,051,788 | A | | 4/2000 | Nichols | |
| 6,444,909 | B1 | | 9/2002 | Prenderville | |

FOREIGN PATENT DOCUMENTS

| EP | 0341805 | 11/1989 |
|---|---|---|
| JP | 10021774 | 1/1998 |
| JP | 11031429 | 2/1999 |

* cited by examiner

Primary Examiner—Dhiru R Patel
(74) Attorney, Agent, or Firm—David L. Ray

(57) ABSTRACT

An electrical outlet cover and an electrical switch plate cover which enable the color of an electrical outlet or an electrical switch plate to be changed without replacing the electrical outlet or electrical switch.

10 Claims, 4 Drawing Sheets

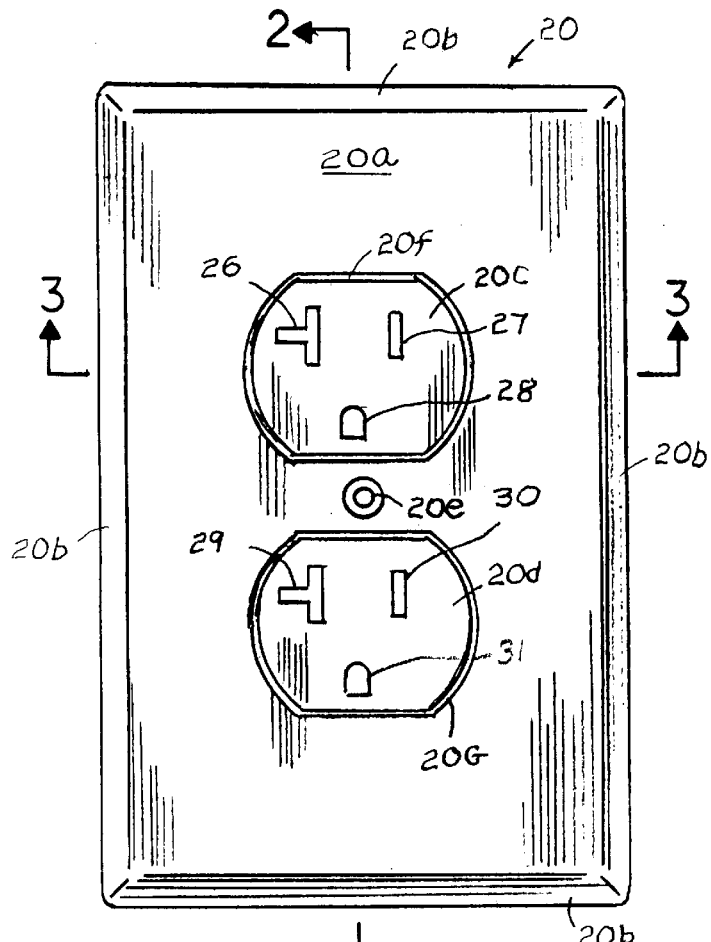
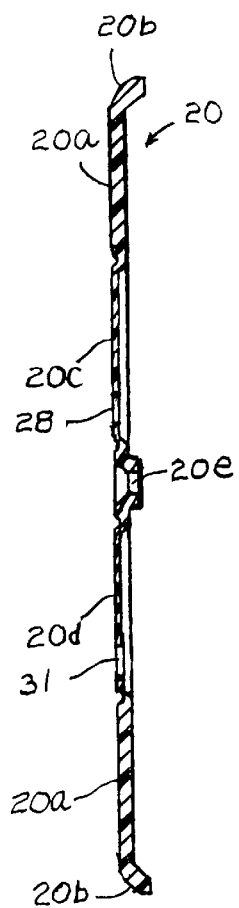
FIG. 1.
FIG. 2.
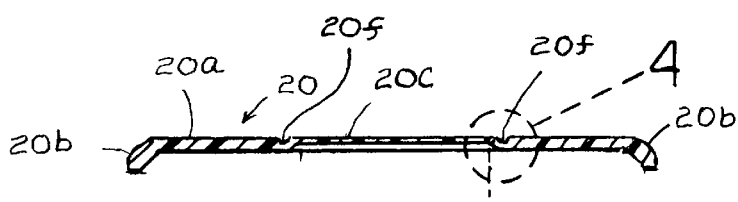
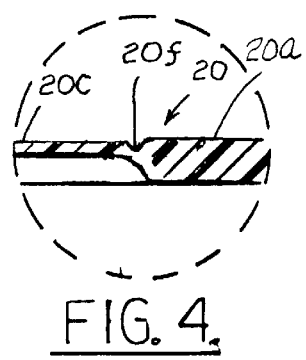
FIG. 3.
FIG. 4.

DECORATIVE ELECTRICAL OUTLET AND SWITCH PLATE COVER

BACKGROUND OF THE INVENTION

1. Field of the Invention

The present invention relates to plates for covering electrical outlets and switches. In particular the present invention relates to decorative electrical outlet and switch plate covers.

2. Description of the Related Art

Electrical outlet and electrical switch covers are well known in the art. However, none of the electrical outlet and electrical switch covers enables the color of the electrical outlet and switch to be quickly and easily changed.

To change the color of an electrical outlet and electrical switch, the electrical outlet or electrical switch must be removed and replaced with an electrical outlet or electrical switch of the desired color, and a new electrical outlet and electrical switch cover plate of the desired color must be added.

Exemplary of the Patents of the related art are the following U.S. Pat. Nos. 2,984,725; 3,028,467; 3,892,935; 4,234,774; 4,731,511; 4,972,045; 5,212,347; 5,240,426; 5,675,125; 5,675,126; 6,051,788 and 6,444,909; European Patent EP341805; Japanese Patent JP10021774; and Japanese Patent JP11031429.

BRIEF SUMMARY OF THE INVENTION

In accordance with the present invention there is provided an electrical outlet cover and an electrical switch plate cover which enable the color of an electrical outlet or an electrical switch plate to be changed without replacing the electrical outlet or electrical switch.

BRIEF DESCRIPTION OF THE SEVERAL VIEWS OF THE DRAWINGS

FIG. 1 is a plan view of the first embodiment of the electrical outlet cover of the invention;

FIG. 2 is a cross-sectional view taken along lines 2—2 of FIG. 1;

FIG. 3 is a cross-sectional view taken along lines 3—3 of FIG. 1;

FIG. 4 is a detailed view of the circled portion of FIG. 3 indicated by the numeral 4.

DETAILED DESCRIPTION OF THE INVENTION

Figure 5:
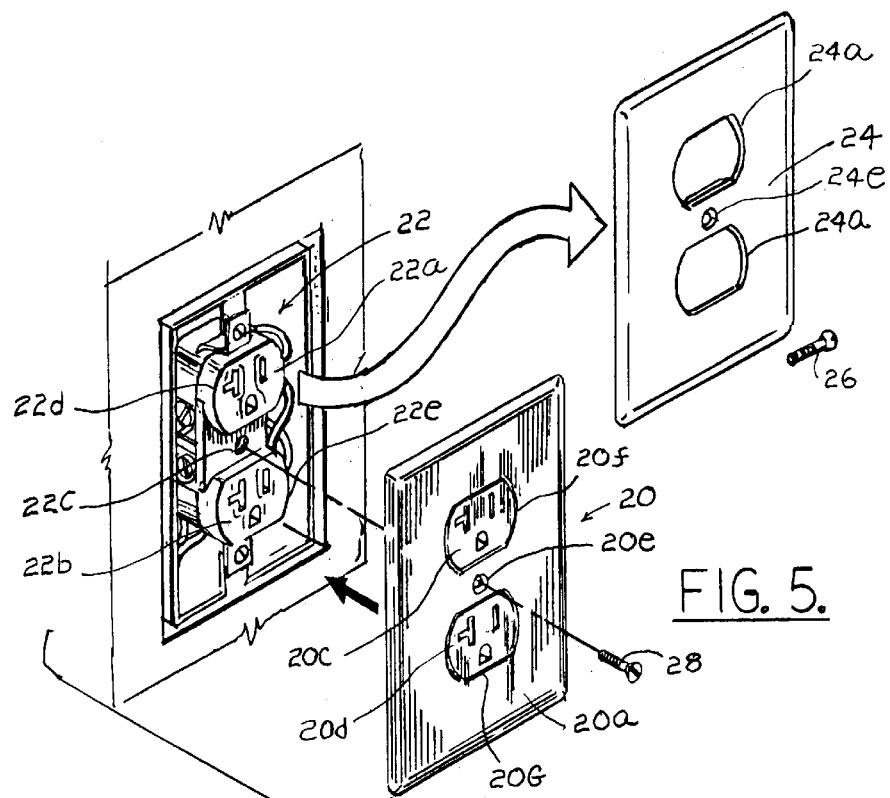
FIG. 5 is an exploded, perspective view of the installation of the first embodiment of the electrical outlet cover of the invention.

Referring now to the drawings, and in particular to FIGS. 1–5, the electrical outlet cover of the first embodiment of the invention is generally indicated by the numeral 20. Cover 20 is configured to cover the conventional electrical outlet generally indicated by the numeral 22 shown in FIG. 5 and thereby enable the color of electrical outlet 22 to be concealed when cover 20 is installed as shown in FIG. 5; thus, the color of the outlet 22 viewed by an observer is the color of cover 20. Utilizing electrical outlet cover 20, the color of electrical outlet 22 is effectively changed without having to remove and replace electrical outlet 22.

Cover 20 is preferably integrally formed from a single piece of rigid material such as a polymeric material commonly referred to as plastic. Cover 20 includes a rectangular face plate 20a preferably having sloping shoulders 20b around the periphery thereof.

Face plate 20a has two plug receptacle covers 20c and 20d formed therein on each side of circular screw receiving opening 20e. Receptacle covers 20c and 20d are positioned on face plate 20a to align with the plug receptacles 22a and 22b, respectively, and screw receiving opening 20e if positioned on face plate 20a to align with internally threaded screw receiving channel 22c.

Preferably, as shown in FIG. 4, plug receptacle covers 20c and 20d are thinner in cross-section that the cross-sectional thickness of face plate 20a to enable plug receptacle covers 20c and 20d to cover plug receptacles 22a and 22b and lie in a plane with face plate 20a. A groove or slot 20f surrounds plug receptacle cover 20c as shown in detail in FIGS. 3 and 4, and a groove or slot 20g surrounds plug receptacle cover 20d to simulate the space between the electrical plug receiving openings 24a in conventional electrical outlet cover 24 in FIG. 5 and the conventional plug receptacles 22a and 22b of electrical outlet 22.

Plug receptacle covers 20c and 20d haves a plurality of openings 26–28 and 29–31 therein, respectively, for receiving the electrically conductive metal prongs of a conventional male electrical plug, and are selected to align with the openings in plug receptacles 22a and 22b of electrical outlet 22.

As shown in FIG. 5, cover 20 is installed over a conventional electrical outlet 22 located in a wall by first removing the conventional electrical outlet cover plate 24 from electrical outlet 22. This is accomplished by removing the screw 26 from screw receiving opening 24e and threaded screw receiving channel 22c in electrical outlet 22 and removing conventional electrical outlet cover plate 24 from conventional electrical outlet 22. A cover plate 20 of the desired color is then aligned with electrical outlet 22 as indicated by the arrow in FIG. 5 and connected thereto by screw 28.

Figure 6:
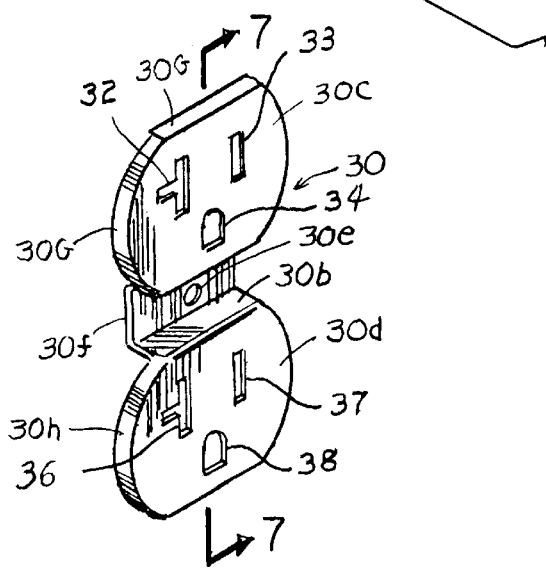
FIG. 6 is a perspective view of a second embodiment of the electrical outlet cover of the invention.
Figure 7:
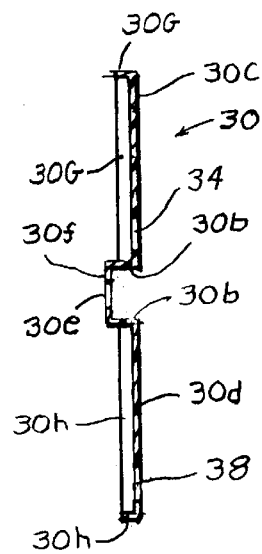
FIG. 7 is a cross-sectional view taken along lines 7—7 of FIG. 6.
Figure 8:
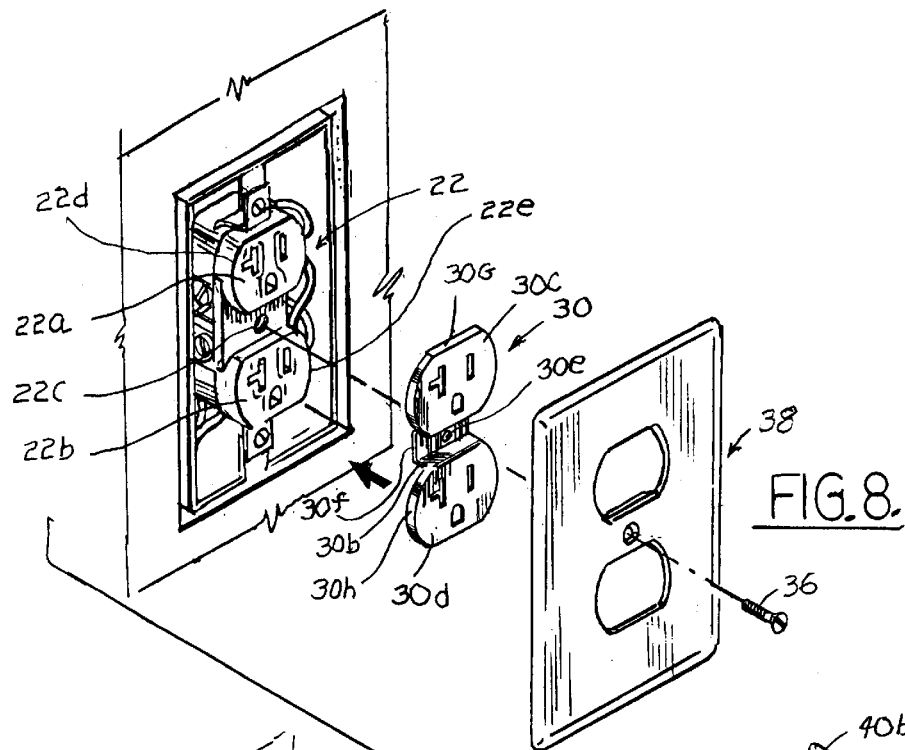
FIG. 8 is an exploded, perspective view of the installation of the second embodiment of the electrical outlet cover of the invention.

Referring now to FIGS. 6–8, the electrical outlet cover of the second embodiment of the invention is generally indicated by the numeral 30. The electrical outlet cover 30 is adapted to be used with a conventional electrical outlet cover 24 shown in FIGS. 5 and 8 and only covers the plug receptacles 22a and 22b of conventional electrical outlet 22. Outlet cover 30 thereby enables the color of the plug receptacles 22a and 22b of conventional electrical outlet 22 to be concealed when cover 20 is installed as shown in FIG. 8; thus, the color of the plug receptacles 22a and 22b of outlet 22 viewed by an observer are the color of cover 30. Utilizing an electrical outlet cover 30, and a second conventional electrical cover 24 if the color of the existing cover 24 is not desired, the color of electrical outlet 22 is effectively changed without having to remove and replace electrical outlet 22.

Cover 30 is integrally formed from a single piece of rigid material such as a polymeric material commonly referred to as plastic. Cover 30 includes two plug receptacle covers 30c and 30d formed therein connected by a U-shaped member generally indicated by the numeral 30a. U-shaped member 30a preferably has two parallel generally rectangular-shaped legs 30b—30b each connected at their upper end to receptacle covers 30c and 30d respectively and each connected at their bottom ends perpendicularly to a generally rectangular connecting member 30f having a circular screw receiving opening 30e in the center thereof.

Preferably plug receptacle covers 30c and 30d lie in a plane and each have a lip 30g and 30h, respectively, which extend around the periphery of covers 30c and 30d. Lips 30g and 30h extend inward perpendicular to the plane contained covers 30c and 30d and fit over the outside edges 22d and 22e of plug receptacles 22a and 22b, respectively to snugly position plug receptacle covers 30c and 30d over plug receptacles 22a and 22b.

Plug receptacle covers 30c and 30d haves a plurality of openings 32–34 and 36–38 therein, respectively, for receiving the electrically conductive metal prongs of a conventional male electrical plug, and plug receptacle covers 30c and 30d and openings 32–34 and 36–38 are positioned to align with the plug receptacles 22a and 22b and the openings in plug receptacles 22a and 22b of electrical outlet 22 shown in FIGS. 5 and 8.

As shown in FIG. 5 and 8, cover 30 is installed over a conventional electrical outlet 22 located in a wall by first removing the conventional electrical outlet cover plate 24 from electrical outlet 22 in a similar manner as explained in reference to FIG. 5. This is accomplished by removing the screw 26 from screw receiving opening 24e and threaded screw receiving channel 22c in electrical outlet 22 and removing conventional electrical outlet cover plate 24 from conventional electrical outlet 22. A cover plate 30 of the desired color is then aligned with electrical outlet 22 as indicated by the arrow in FIG. 8. A conventional electrical outlet cover 38 identical in shape to conventional outlet cover 24 but of a desired color is then connected to outlet 22 by placing the cover 30 over outlet 22 as indicated by the arrow in FIG. 8, and then by inserting screw 36 through conventional outlet cover 38 and cover plate 30 into threaded screw receiving channel 22c of outlet 22.

Figure 9:
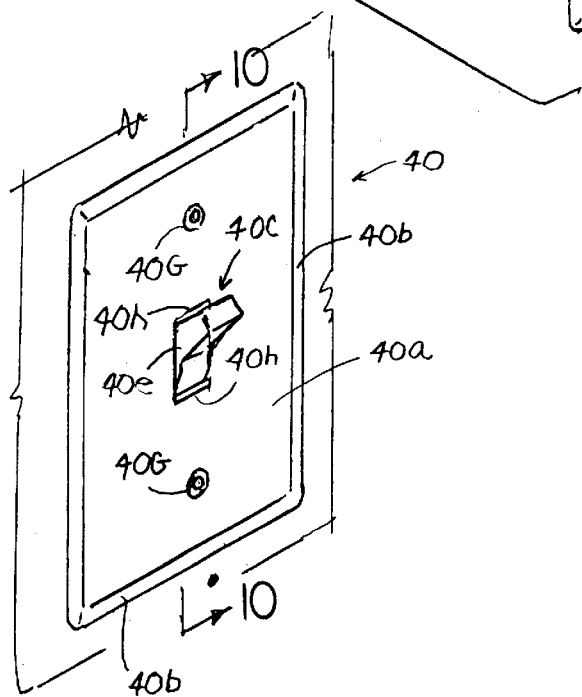
FIG. 9 is a perspective view of the switch plate cover of the invention.
Figure 10:
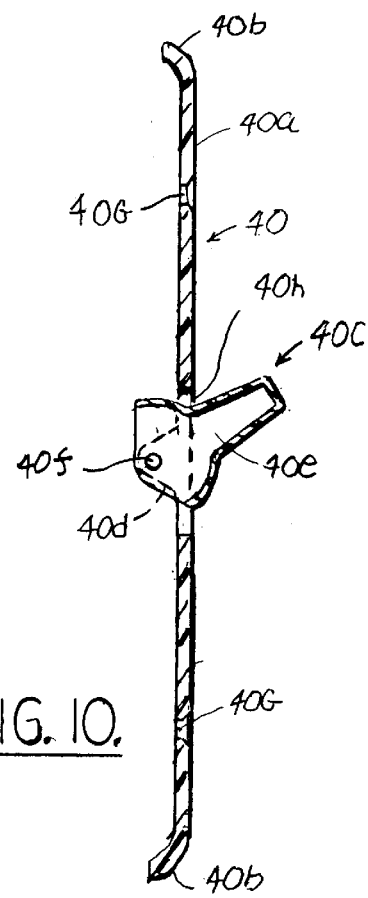
FIG. 10 is a cross-sectional view taken along lines 10—10 of FIG. 9.
Figure 11:
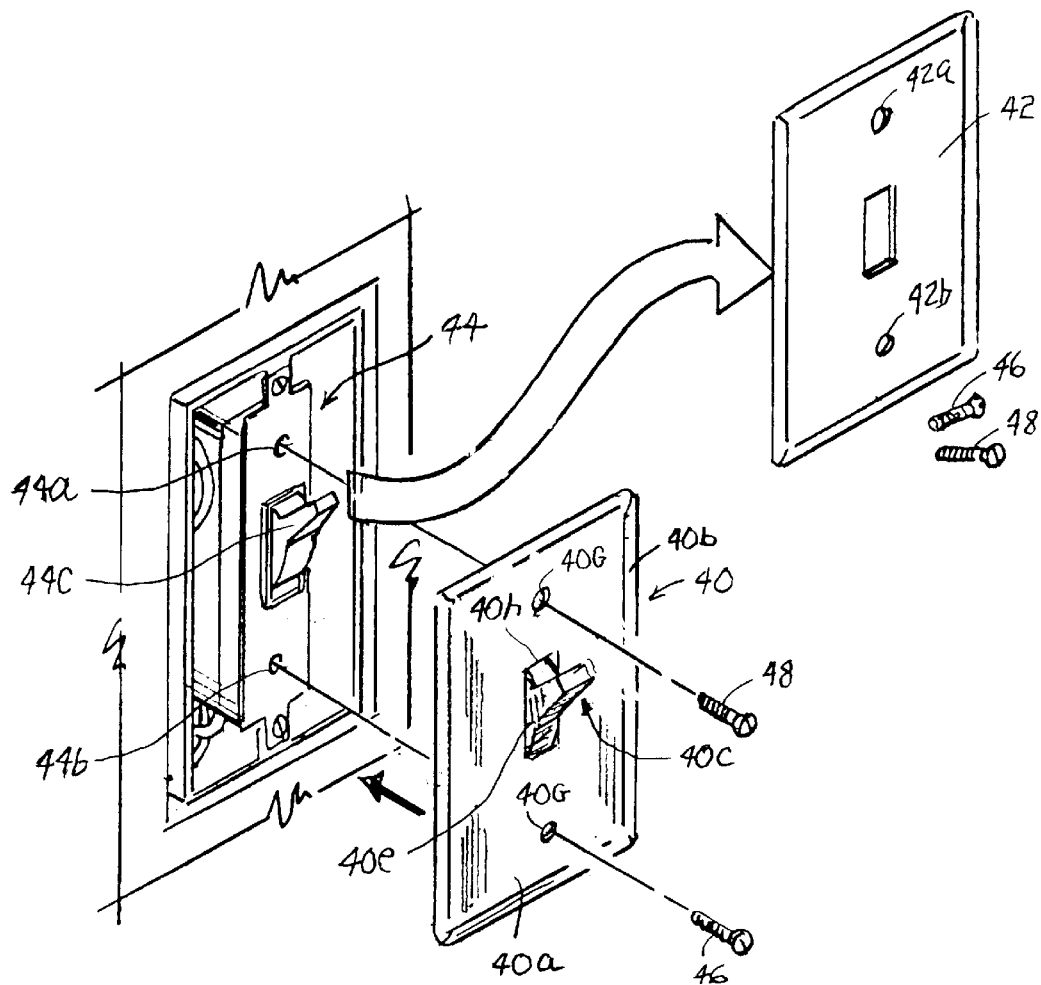
FIG. 11 is an exploded, perspective view of the installation of the switch plate cover of the invention.

Referring now to FIGS. 9–11, the electrical switch plate cover of the invention is generally indicated by the numeral 40. Cover 40 is configured to replace the conventional electrical switch plate generally indicated by the numeral 42 shown in FIG. 11 and cover the conventional switch 44c of the conventional electrical switch assembly generally indicated by the numeral 44, thereby enabling the color of electrical switch 44a to be concealed when cover 40 is installed as shown in FIG. 11; thus, the color of the switch 44a viewed by an observer would be the color of cover 40. Utilizing electrical switch cover 40, the color of electrical switch 44a is effectively changed without having to remove and replace conventional electrical switch assembly 44.

Cover 40 is integrally formed from a single piece of rigid material such as a polymeric material commonly referred to as plastic. Cover 40 includes a rectangular face plate 40a preferably having sloping shoulders 40b around the periphery thereof Cover 40 has two circular screw openings 40g—40g for receipt of screws 46–48.

Face plate 40a has a switch cover sleeve generally indicated by the numeral 40c extending from rectangular opening 40h in face plate 40a which receives switch 44a therein and covers switch 44a. Switch cover sleeve 40c conforms to the shape of switch 44a and is preferably made from a polymeric plastic material.

Cover 40 has two rigid tabs 40d—40d formed perpendicularly and parallel to each other on the inside of face plate 40a on the periphery of rectangular opening 40h, one of which tabs 40d is shown in FIG. 10. Switch cover sleeve 40c has two parallel side walls 40e—40e which are rotatably connected to tabs 40d—40d by fastener 40f. Fastener 40f is preferably a pin. Tabs 40d—40d and sloping shoulders 40b are selected of sufficient length to prevent tabs 40d—40d from striking any portion of switch assembly 44.

As shown in FIG. 11, cover 40 is installed over a conventional electrical switch 44 located in a wall by first removing the conventional electrical switch cover plate 42 from electrical switch 44. This is accomplished by removing the screws 46 and 48 from screw receiving openings 42a and 42b and threaded screw receiving channels 44a and 44b in conventional electrical switch assembly 44 and removing conventional electrical switch cover plate 42 from conventional electrical switch assembly 44. A cover plate 40 of the desired color is then aligned with electrical switch assembly 44 as indicated by the arrow in FIG. 11 and connected thereto by screws 46 and 48.

Although the preferred embodiments of the invention have been described in detail above, it should be understood that the invention is in no sense limited thereby, and its scope is to be determined by that of the following claims:

What is claimed is:

1. A decorative electrical outlet cover for changing the color of an existing electrical outlet installed in a wall, the existing electrical outlet having two plug receptacles and an internally threaded screw receiving channel for receiving a screw for connecting an outlet cover to the electrical outlet, without replacing the existing electrical outlet, comprising:

a. two spaced apart plug receptacle covers, each of said plug receptacle covers having a plurality of openings therein for receipt of the prongs of an electrical plug, b. a U-shaped member connecting said two spaced apart plug receptacle covers and integrally formed therewith, and c. an opening in said U-shaped member for receipt of a screw for fastening said two spaced apart plug receptacle covers and said U-shaped member to said existing electrical outlet.

2. The decorative outlet cover of claim 1, wherein said two plug receptacle covers are positioned on said U-shaped member to be in alignment with said two plug receptacles of said existing electrical outlet when a screw is placed in said opening in said U-shaped member and said U-shaped member and said spaced apart plug receptacle covers are connected to said existing electrical outlet by said screw.

3. The decorative outlet cover of claim 2 wherein said U-shaped member has two legs, each of said legs being connected at one end to one of said two plug receptacle covers, each of said legs being connected at the other end to a generally rectangular connecting member.

4. The decorative outlet cover of claim 3 wherein each of said two legs is generally rectangular in shape.

5. The decorative outlet cover of claim 4 wherein said two legs are parallel to each other.

6. The decorative outlet cover of claim 3 wherein said rectangular connecting member has said opening therein for receipt of a screw.

7. The decorative outlet cover of claim 1 wherein said two spaced apart receptacle covers lie in a plane.

8. The decorative outlet cover of claim 7 wherein each of said two spaced apart receptacle covers has a lip extending around the periphery thereof.

9. The decorative outlet cover of claim 8, wherein said lip extends downward from the plane containing said two spaced apart receptacle covers.

10. The decorative outlet cover of claim 9 wherein said lip is perpendicular to the plane containing said two spaced apart receptacle covers.

* * * * *